(12) United States Patent
Dwyer (10) Patent No.: US 10,518,736 B2
(45) Date of Patent: Dec. 31, 2019

(54) THRUST NEUTRAL INFLATION ASSEMBLY AND METHODS OF USE

(71) Applicant: The Boeing Company, Chicago, IL (US)

(72) Inventor: Jon Erik Dwyer, North Richland Hills, TX (US)

(73) Assignee: THE BOEING COMPANY, Chicago, IL (US)

(*) Notice: Subject to any disclaimer, the term of this patent is extended or adjusted under 35 U.S.C. 154(b) by 110 days.

(21) Appl. No.: 15/801,645

(22) Filed: Nov. 2, 2017

(65) Prior Publication Data

US 2019/0126880 A1 May 2, 2019

(51) Int. Cl.
| | |
|---|---|
| *B60R 21/217* | (2011.01) |
| *B60R 21/276* | (2006.01) |
| *B60R 21/261* | (2011.01) |
| *B60R 21/201* | (2011.01) |
| *B60R 21/264* | (2006.01) |
| *B60R 21/26* | (2011.01) |

(52) U.S. Cl.
CPC ........ *B60R 21/2171* (2013.01); *B60R 21/201* (2013.01); *B60R 21/261* (2013.01); *B60R 21/2646* (2013.01); *B60R 21/276* (2013.01); *B60R 2021/2615* (2013.01); *B60R 2021/26094* (2013.01); *B60R 2021/2765* (2013.01)

(58) Field of Classification Search
CPC ............ B60R 21/2171; B60R 21/2646; B60R 21/201; B60R 21/276; B60R 21/261; B60R 2021/2765
See application file for complete search history.

(56) References Cited

U.S. PATENT DOCUMENTS

| | | | | |
|---|---|---|---|---|
| 3,865,398 A | * | 2/1975 | Woll | ....................... B60R 21/18 280/733 |
| 5,029,851 A | * | 7/1991 | Hagen | ................... A63F 9/0079 273/458 |
| 5,441,299 A | | 8/1995 | Lauritzen et al. | |
| 5,468,012 A | | 11/1995 | Mihm | |
| 5,496,203 A | * | 3/1996 | Murray | ................... A63H 27/10 446/221 |
| 5,509,686 A | | 4/1996 | Shepherd et al. | |
| 5,611,563 A | | 3/1997 | Olson et al. | |
| 6,129,380 A | * | 10/2000 | Rink | ..................... B60R 21/264 280/735 |

(Continued)

FOREIGN PATENT DOCUMENTS

EP    0547842 A1    6/1993

*Primary Examiner* — Darlene P Condra
(74) *Attorney, Agent, or Firm* — Coats & Bennett, PLLC (57) ABSTRACT

An inflation assembly for use within a vehicle. The inflation assembly is configured to deliver gas from a pressure source to the one or more inflatable devices. The inflation assembly includes a fitting that engages with the pressure source and receives gas from the pressure source. The fitting includes outlet ports that are oriented to direct the gas away from the fitting and into hoses that lead to one or more inflatable devices. The outlet ports are configured to release gas in outward directions such that reactive forces that are applied to the fitting by the released gas are neutralized. This prevents the pressure source from moving and potentially injuring a person or damaging the vehicle.

17 Claims, 12 Drawing Sheets

(56) References Cited

U.S. PATENT DOCUMENTS

| | | | | |
|---|---|---|---|---|
| 6,601,871 B2* | 8/2003 | Fischer | ............... | B60R 21/201 |
| | | | | 280/730.2 |
| 7,938,443 B1 | 5/2011 | Smith | | |
| 8,567,819 B2 | 10/2013 | Iwakiri | | |
| 8,789,565 B1* | 7/2014 | Wicken | ............... | A63H 27/10 |
| | | | | 141/237 |
| 2001/0011810 A1* | 8/2001 | Saiguchi | ............. | B60N 2/4221 |
| | | | | 280/728.1 |
| 2006/0043714 A1* | 3/2006 | Mramor | ............... | B60R 21/26 |
| | | | | 280/736 |
| 2007/0052223 A1* | 3/2007 | Parkinson | ............. | B60R 21/26 |
| | | | | 280/740 |
| 2008/0121309 A1* | 5/2008 | Boise | ................... | A63H 27/10 |
| | | | | 141/313 |
| 2010/0164208 A1* | 7/2010 | Kalandek | ........... | B60R 21/2171 |
| | | | | 280/736 |
| 2014/0295728 A1* | 10/2014 | Cayton | ................. | F21S 10/02 |
| | | | | 446/220 |
| 2015/0283473 A1* | 10/2015 | Frazier | ................. | A63H 27/10 |
| | | | | 141/96 |
| 2016/0288590 A1* | 10/2016 | Hennig | ............... | B60C 23/003 |

\* cited by examiner

THRUST NEUTRAL INFLATION ASSEMBLY AND METHODS OF USE

TECHNOLOGICAL FIELD

The present disclosure generally relates to an inflation assembly. More particularly, the present disclosure relates to devices and methods for directing gas in an inflation assembly that is expelled from a pressure source in a thrust-neutral manner and which is directed to an inflatable device.

BACKGROUND

Inflatable devices, such as an airbag and an inflatable seat belt, are different types of safety devices designed to protect a person in a vehicle at the time of a sudden event, such as an impact of the vehicle with another object or a rapid sudden deceleration. The airbag which is in a stowed, deflated configuration prior to the event is design, rapidly deploys and inflates to protect the person.

An inflation assembly generally includes a pressure source, an inflatable member, and one or more gas paths that lead from the pressure source to the inflatable member. The pressure source includes a rigid body with an outlet through which the gas is expelled. The pressure source is usually secured in the vehicle in relatively close proximity to the inflatable member. This can include positioning of the pressure source in a dashboard, a seat, or a wall of a vehicle.

For the airbag to be rapidly deployed at the time of the event, the gas is released at a high velocity out of the outlet. This release exerts a reactive thrust on the pressure source. If the pressure source is not adequately secured, the pressure source can forcefully move within the vehicle and injure a person and/or damage the vehicle.

To prevent the pressure source from moving, the pressure source is secured within the vehicle. This can include extensive clamping to the interior of the vehicle. This clamping can include expensive components, particularly when factoring in the large number of clamps for airbags in a large vehicle, such as a commuter aircraft. Further, the clamping can involve a large amount of worker hours for each vehicle. Workers are required to install each of the pressure sources in a manner in which they will not move during activation.

SUMMARY

The present application includes an inflation assembly that delivers gas to one or more inflatable devices. The inflation assembly is constructed to deliver the gas in a thrust-neutral manner to prevent a pressure source from which the gas is delivered from becoming a projectile which could potentially hurt a person or damage the structure of a vehicle in which the assembly is mounted.

One aspect is directed to an inflation assembly. The inflation assembly includes a fitting configured to engage with and receive gas from a pressure source. The fitting includes outlet ports oriented to direct the gas from the fitting radially outward away from a longitudinal axis of the fitting with the outlet ports being symmetrically disposed about the longitudinal axis. The inflation assembly also includes hoses that each includes a first hose end mounted to a corresponding outlet port and an opposing second hose end spaced away from the corresponding first hose end. The hose is configured to direct the gas exhausted through the corresponding outlet port away from the fitting.

In another aspect, the fitting includes a total of two outlet ports that are spaced apart by an angular distance of 180°.

In another aspect, the fitting includes an opening through which the gas is received and a closed bottom side and the longitudinal axis of the fitting extends through the opening and the bottom side.

In another aspect, the inflation assembly also includes a valve positioned downstream from each one of the outlet ports with each of the valves configured to control an amount of the gas that flows along the hose that is mounted to the outlet port.

In another aspect, each of the valves includes a valve inlet that receives the gas, a valve outlet through which the gas is expelled, and a chamber positioned between the valve inlet and the valve outlet with the valve also including a constriction body that is biased into the chamber to control a size of the chamber through which the gas moves between the valve inlet and the valve outlet.

In another assembly, each of the valves is configured to move between a first position with the constriction body extending a first distance into the chamber when the gas is moving along the hose at a first velocity, a second position that extends a greater distance into the chamber than the first amount when the gas moving along the hose at a second velocity that is greater than the first velocity, and a third position that extends a smaller distance into the chamber than the first distance when the gas moving along the hose is at a third velocity that is less than the first velocity.

In another aspect, the inflation assembly includes sensors positioned along the hoses to sense a flow of the gas along the hoses and a control circuit that receives signals from the sensors with the control circuit operable to equalize a flow of gas along each of the hoses.

Another aspect is directed to an inflation assembly. The inflation assembly includes a pressure source to provide gas at a pressure and an outlet through which the gas is released. A fitting is connected to the pressure source at the outlet. The fitting includes an opening through which the gas is received from the pressure source and outlet ports oriented to direct the gas from the fitting radially outward away from a longitudinal axis of the fitting with the outlet ports being symmetrically disposed about the longitudinal axis. The inflation assembly also includes hoses connected to the outlets to direct the gas away from the pressure source with each of the hoses including a first hose end mounted to one of the outlet ports and an opposing second hose end spaced away from the first end. The inflation assembly also includes one or more inflatable devices connected to the second ends of the hoses.

In another aspect, the inflation assembly also includes valves positioned downstream from the outlet ports with one of the valves positioned downstream from each one of the outlet ports with each of the valves configured to control an amount of the gas that flows along one of the hoses.

In another aspect, the inflation assembly includes a control circuit that controls a size of a chamber of the valves to equalize a flow of gas along each of the hoses.

In another aspect, each of the valves includes a valve inlet through which the gas is received, a valve outlet through which the gas is expelled, and a chamber positioned between the valve inlet and the valve outlet with the valve further including a constriction body that is biased into the chamber to control a size of the chamber through which the gas moves between the valve inlet and the valve outlet.

In another aspect, the constriction body of each of the valves is configured to move between a first position that extends a first distance into the chamber when the gas is moving along the hose at a first velocity, a second position that extends a greater distance into the chamber than the first distance when the gas moving along the hose is at a second velocity that is greater than the first velocity, and a third position that extends a smaller distance into the chamber than the first distance when the gas moving along the hose is at a third velocity that is less than the first velocity.

In another aspect, each of the outlet ports is spaced an equal distance away from the longitudinal axis of the fitting.

In another aspect, at least two of the hoses are connected to one of the inflatable devices.

In another aspect, the inflation assembly includes a sensor positioned along each of the hoses to sense a flow of the gas along the hose and a control circuit that receives signals from the sensors with the control circuit operable to equalize a flow of gas along each of the hoses.

Another aspect is directed to a method of delivering gas from a pressure source. The method includes receiving a gas at a pressure from an outlet of the pressure source and into an interior space of the fitting. The method includes dispensing the gas from the interior of the fitting through outlet ports that are spaced apart around the fitting causing the gas to escape from the fitting in a thrust-neutral manner. The method also includes directing the gas from the fitting into hoses that are attached to each of the outlet ports.

In another aspect, the method also includes dispensing a first portion of the gas through a first one of the outlet ports in a first radial direction and a second portion of the gas through a second one of the outlet ports in a second radial direction that is opposite from the first direction.

In another aspect, the method also includes equalizing a flow rate of the gas through each of the outlet ports and each of the hoses.

In another aspect, the equalizing includes automatically adjusting a valve associated with a first one of the hoses and controlling the flow rate of the gas along the first one of the hoses.

In another aspect, the method also includes reducing a size of a valve associated with a first one of the hoses and equalizing an amount of the gas moving through each of the hoses.

DETAILED DESCRIPTION

The present application is directed to inflation assemblies and methods of use. The inflation assembly is configured to deliver gas from a pressure source to one or more inflatable devices. The inflation assembly includes a fitting that engages with the pressure source and receives gas from the pressure source. The fitting includes outlet ports that are oriented to direct the gas away from the fitting and into hoses that lead to one or more inflatable devices. The outlet ports are configured to release gas in outward directions such that reactive forces that are applied to the fitting by the released gas are neutralized. This prevents the pressure source from moving and potentially injuring a person or damaging the vehicle.

Figure 1:
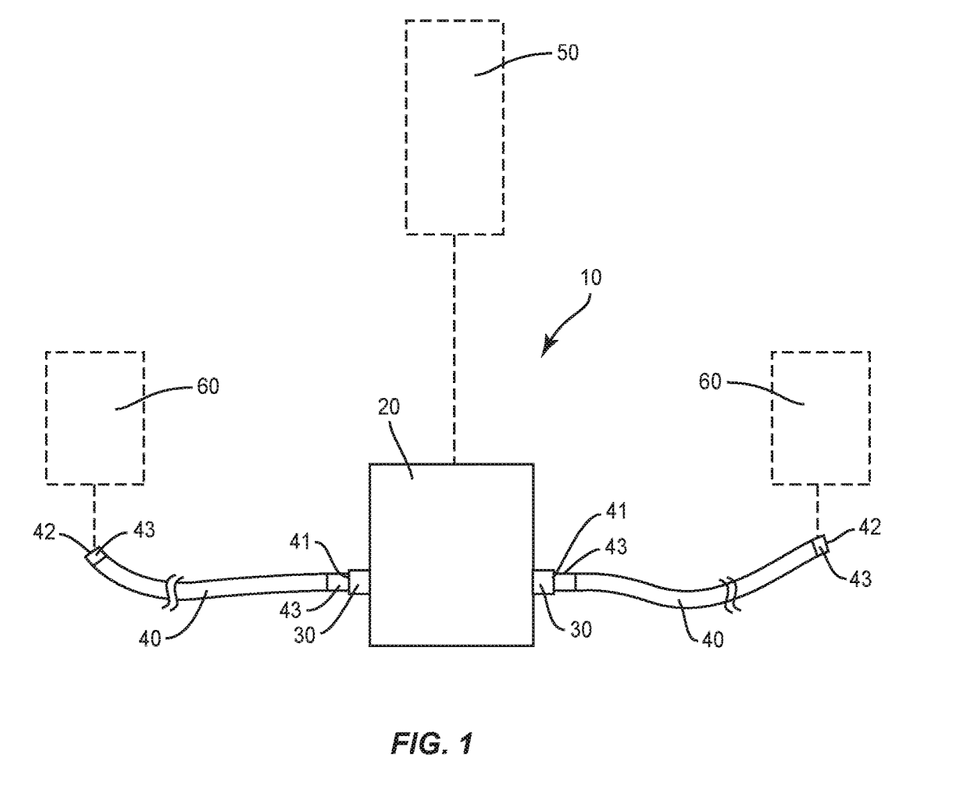
FIG. 1 is a side view of an inflation device that delivers gas from a pressure source to one or more inflatable devices.

FIG. 1 illustrates an inflation assembly 10 that includes a fitting 20, outlet ports 30, and hoses 40. The inflation assembly 10 receives gas from a pressure source 50 and delivers the gas to one or more inflatable devices 60. The outlet ports 30 on the fitting provide for the gas to exit from the fitting 20. The outlet ports 30 are configured such that the reactive forces applied by the escaping gas in the different directions offset one another resulting in an overall thrust that is applied to the inflation assembly 10 being neutral. This prevents the inflation assembly 10 from moving and possibly becoming a projectile.

The fitting 20 can be connected directly to the pressure source 50 or can be connected to the pressure source 50 through an intermediate member such as one or more hoses. The fitting 20 can remain connected to the pressure source 50 for the assembly 10 to remain thrust-neutral after manufacture, including during storage, transportation, installation, once fully installed, and in-service and during maintenance.

Figure 2:
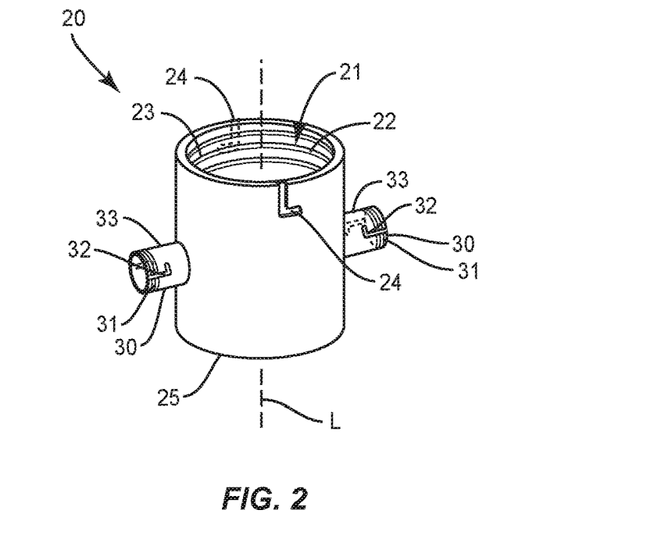
FIG. 2 is a perspective view of a fitting.

FIG. 2 illustrates a fitting 20 configured to connect to and receive the gas from the pressure source. The fitting 20 includes an opening 21 that is sized to engage with the pressure source 50. The opening 21 leads into an interior space 22 which is contained by a bottom side 25. A longitudinal axis L of the fitting 20 extends through the opening 21, the interior space 22, and the bottom side 25.

The opening 21 can include threads 23 that engage with corresponding threads on the pressure source 50 to connect to the pressure source 50. The opening 21 can also be configured for other mechanical connections, including one or more slots 24 that extend inward from the opening 21. Each of the slots 24 is sized to receive a projection on the pressure source 50 to secure the fitting 20 to the pressure source 50. The slots 24 can include jogs at a distal end such that the fitting 20 can be twisted once the projections are inserted to secure the fitting to the pressure source 50.

Outlet ports 30 in the fitting 20 provide for directing the gas from the interior space 22. The outlet ports 30 can include various shapes and sizes. FIG. 2 includes the outlet ports 30 with necks 33 that extend radially outward away from the interior space 22. The outlet ports 30 can also be formed without necks 33 and include just openings through the fitting 20. The outlet ports 30 are configured to receive the hoses 40. This can include threads 31 or one or more slots 32 that engage with the hoses 40. The number and positioning of the outlet ports 30 about the fitting 20 can vary depending upon the inflation assembly 10.

Figure 3:
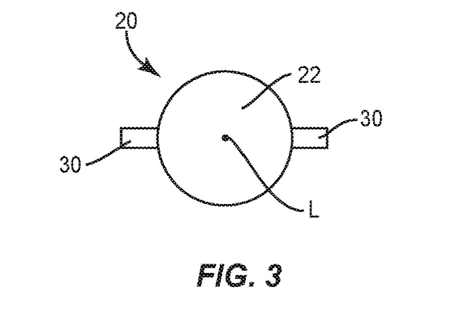
FIG. 3 is a schematic plan view of a fitting with a pair of outlet ports.
Figure 4:
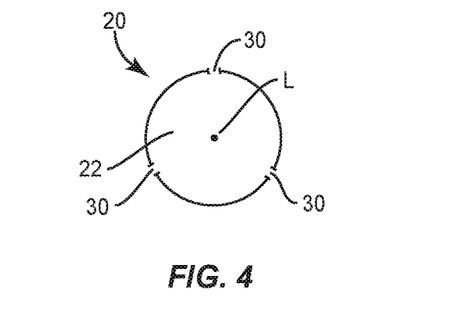
FIG. 4 is a schematic plan view of a fitting with three outlet ports.
Figure 5:
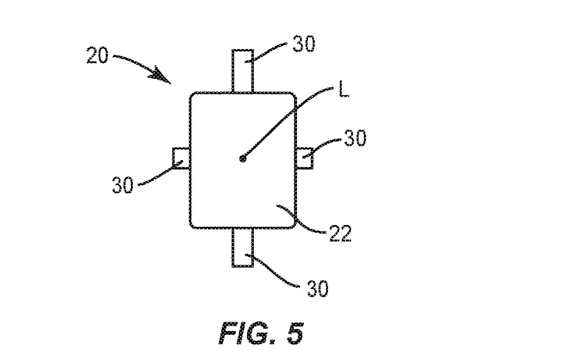
FIG. 5 is a schematic plan view of a fitting with four outlet ports.

FIGS. 3, 4, and 5 schematically illustrate fittings 20 with outlet ports 30 symmetrically disposed about the interior space 22 of the fitting 20 to direct the gas in opposing directions radially outward and away from the longitudinal axis L. FIG. 3 includes a pair of outlet ports 30 on opposing sides of the fitting 20 that are spaced apart by an angular distance of 180°. FIG. 4 includes a fitting 20 with three outlet ports 30 that direct the gas away from the longitudinal axis L and that are spaced apart by an angular distance of 120°. FIG. 5 includes four outlet ports 30 that are spaced apart by an angular distance of 90°.

The outlet ports 30 are arranged around the fitting 20 to direct the gas radially outward away from the fitting 20. When directed through each outlet port 30, the escaping gas applies a reactive thrust force to the fitting 20 in the opposing direction from the movement direction of the gas. The outlets ports 30 are arranged around the fitting such that these reactive thrust forces counteract each other to neutralize an overall motive force that is applied to the pressure source 50. This thrust-neutral arrangement of the outlet ports 30 prevents the pressure source 50 from moving during the release of the gas and possibly becoming a projectile that could injure a person and/or damage the vehicle.

Figure 6:
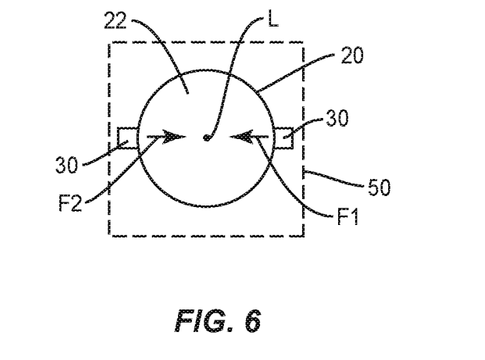
FIG. 6 is a schematic plan view of a fitting with two outlet ports and reactive forces applied by gas that exits through the outlet ports.

FIG. 6 schematically illustrates the thrust-neutral arrangement of the outlet ports 30 of a fitting 20. The fitting 20 includes a pair of opposing outlet ports 30 on opposing sides of the interior space 22. A first reactive thrust force F1 is applied to the fitting 20 and attached pressure source 50 through the gas that is released through the first outlet port 30. A second reactive thrust force F2 is applied to the fitting 20 and attached pressure source 50 in the opposing direction through the gas released through the second outlet port 30. The forces F1, F2 offset each other to neutralize the overall motive force applied to the fitting 20 and attached pressure source 50.

Figure 7:
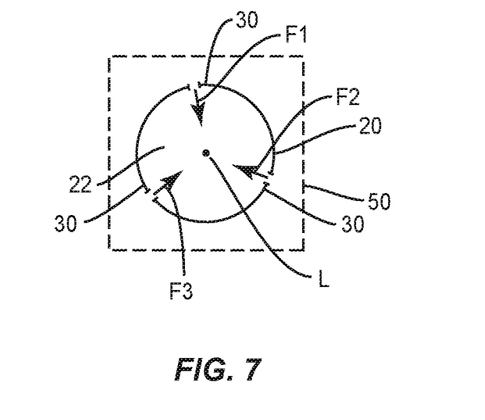
FIG. 7 is a schematic plan view of a fitting with three outlet ports and reactive forces applied by gas that exits through the outlet ports.
Figure 8:
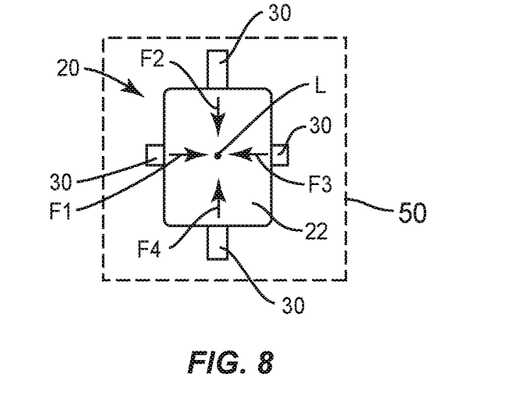
FIG. 8 is a schematic plan view of a fitting with four outlet ports and reactive forces applied by gas that exits through the outlet ports.

FIG. 7 illustrates a fitting 20 with three outlet ports 30. The reactive thrust forces F1, F2, F3 applied by the gas that is released through each of the outlet ports 30 counteract each other. This results in the overall motive force on the fitting 20 and attached pressure source 50 being thrust-neutral. FIG. 8 illustrates a fitting with four outlet ports 30. The reactive thrust forces F1, F2, F3, F4 applied by the gas again result in an overall motive force that is thrust-neutral.

The hoses 40 direct the gas from the outlet ports 30 farther away from the fitting 20. As illustrated in FIG. 1, each hose 40 includes a first end 41 and an opposing second end 42. Collars 43 can be mounted to one or both of the ends 41, 42 to attach to the fitting 20 and/or inflatable device 60. The collars 43 can be rotatably mounted on the hoses 40 and include interior threads configured to mate respectively with corresponding threads 31 on the outlet ports 30 and the inflatable devices 60. The hoses 40 can include various lengths and inner diameters.

Figure 9:
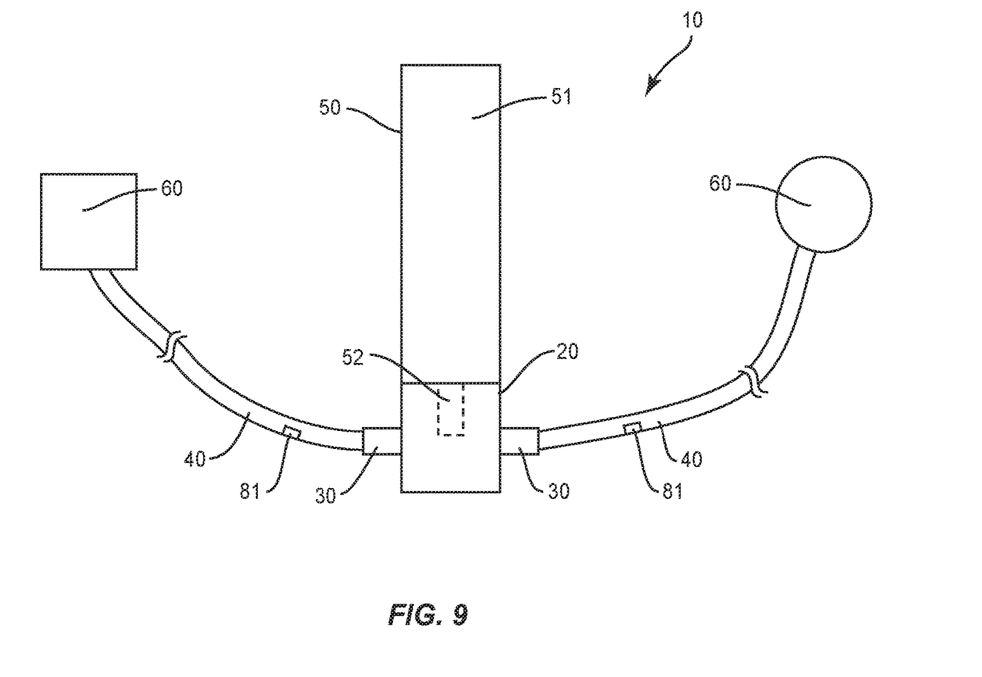
FIG. 9 is a side view of an inflation device.

FIG. 9 illustrates an inflation assembly 10 that includes a pressure source 50, a fitting 20 attached to the pressure source 50 and having outlet ports 30 that release the gas in different radial directions. Hoses 40 are attached to the outlet ports 30 and extend to one or more inflatable devices 60.

The pressure source 50 includes a rigid exterior housing 51. The housing 51 can include an elongated shape as illustrated in FIG. 9. The pressure source 50 is connected to one or more sensors that identify an event that implements the needs to deploy the inflatable devices 60. When an event occurs, the pressure source releases the pressurized gas through an outlet 52 positioned at an end of the housing 51. The outlet 52 can include an axial configuration as illustrated in FIG. 9 in which the gas is released in the same direction as a longitudinal axis of the pressure source 50. Another configuration includes an elbow fitting in which the gas is expelled in a direction transverse to the longitudinal axis of the pressure source 50, such as at 90°.

One or more inflatable devices 60 are mounted to the second ends 42 of the hoses 40. The inflatable devices 60 can be fabricated from thin fabrics, including nylon and polyester fabrics. The inflatable devices 60 are arranged in a stowed orientation when not in use. This can include the inflatable devices 60 folded to occupy a minimum amount of space. Upon receiving the gas, the inflatable devices 60 assume a deployed orientation to contact against the person or persons in the vehicle. One specific inflatable device 60 is an air bag that deploys from a folded configuration to an enlarged shape and size. Another inflatable device 60 is a two-point lap seat belt that is worn across the lap of a person. In a stowed orientation, the belt has a reduced size. Upon deployment, the belt expands in size to shield the person.

Figure 10:
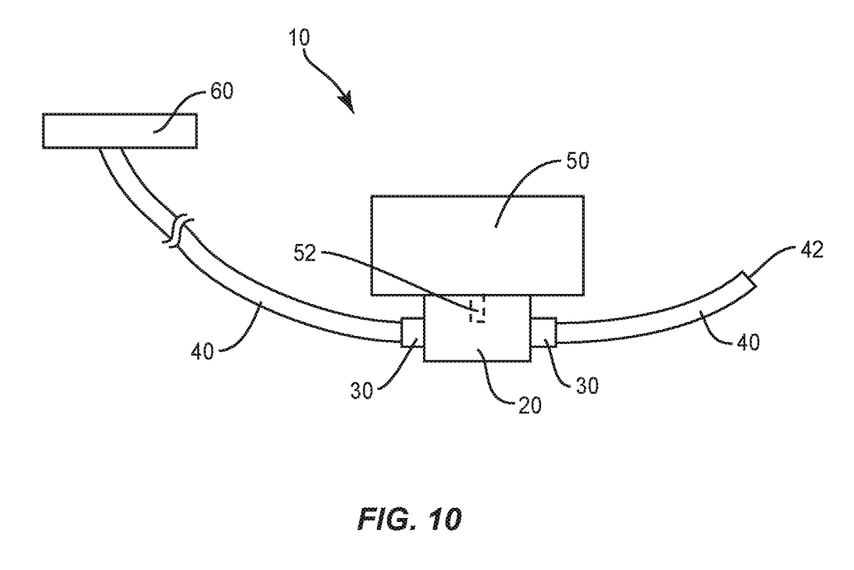
FIG. 10 is a side view of an inflation device.

FIG. 9 includes an inflation assembly 10 in which each of the hoses 40 are attached to an inflation device 60. FIG. 10 includes an inflation assembly 10 with one of the hoses 40 that vents the gas instead of delivering it to an inflation device 60. This inflation assembly 10 includes a pair of hoses 40 extending outward from the fitting 20. The hoses 40 are connected to opposing outlet ports 30 that neutralize the reactive thrusts exerted by the escaping gas. A first hose 40 extends from the first outlet port 30 to an inflatable device 60. A second hose 40 extends from the second outlet port 30. The second hose 40 delivers the gas away from the fitting but the second end 42 is not attached to an inflatable device 60. Rather, the second end 42 is unattached to simply vent the gas. The second outlet port 30 neutralizes the reactive thrust force exerted on the fitting 20, but is not necessary to deliver the gas to inflate an inflatable device 60.

Figure 11:
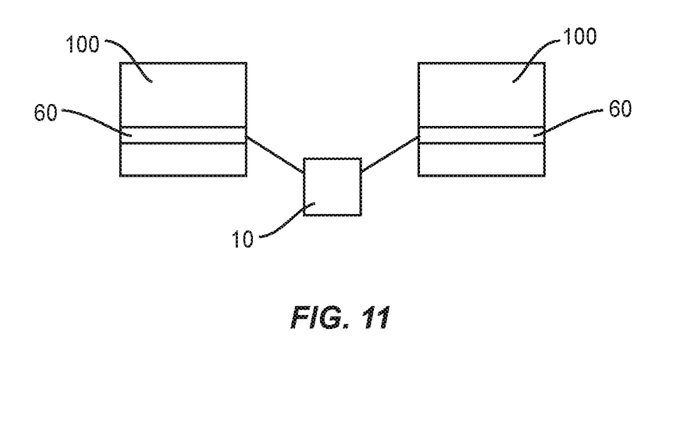
FIG. 11 is a schematic view of an inflation device with a pair of inflatable devices.
Figure 12:
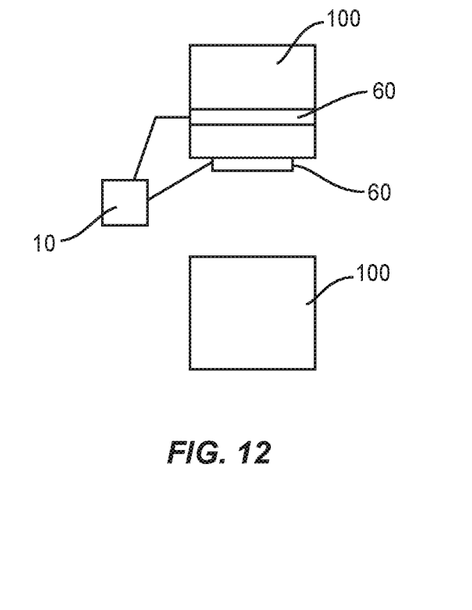
FIG. 12 is a schematic view of an inflation device with a pair of inflatable devices.
Figure 13:
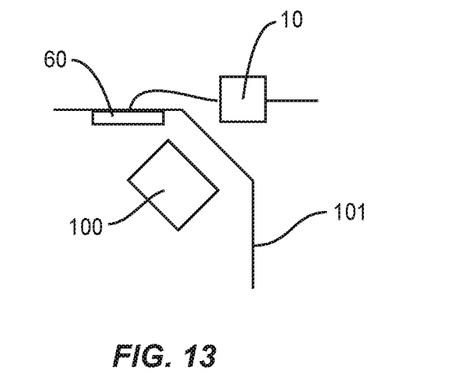
FIG. 13 is a schematic view of an inflation device with an inflatable device.

The inflation assembly 10 can be configured to accommodate a variety of different arrangements. FIG. 11 includes an inflation assembly 10 with a pair of seat belt inflatable devices 60 in a pair of seats 100. A similar arrangement can be used for the inflation assembly 10 to support a pair of seat-back inflatable devices 60. FIG. 12 includes an inflation assembly 10 that deploys a first seat belt inflatable device 60 to protect a person seating in a first seat 100, and a seat-back inflatable device 60 to protect a person seating in a rear second seat 100. FIG. 13 includes the inflation assembly 10 mounted in a wall 101 of the vehicle. The inflatable device 60 is positioned in the wall to protect a person in the adjacent seat 100. The inflation assembly 10 supports a single inflatable device 60. The hose opposing the inflatable device 60 vents openly and is not associated with an inflatable device.

Figures 14, 15:
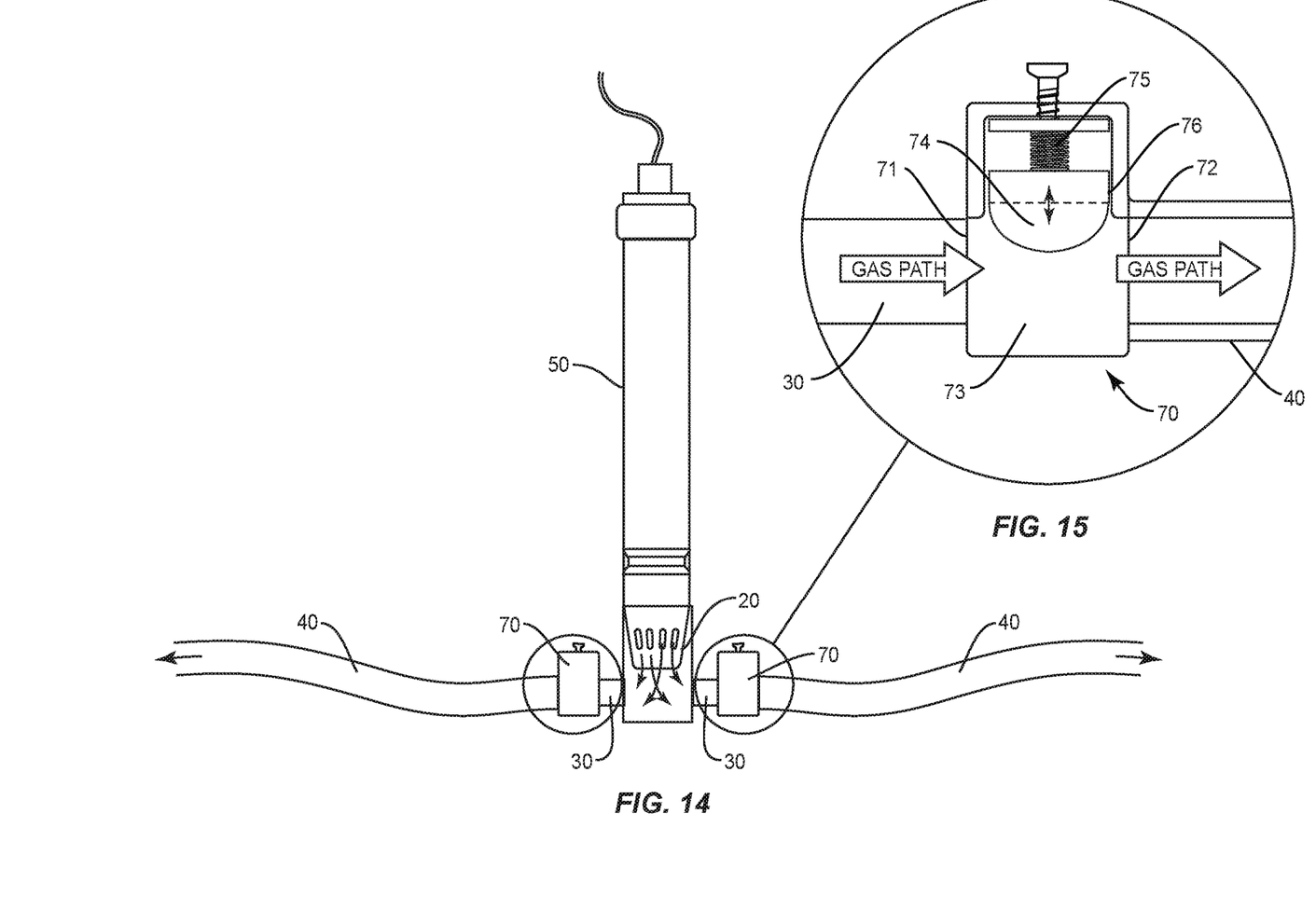
FIG. 14 is a side schematic view of an inflation device with valves positioned with each outlet port.
FIG. 15 is a side schematic view of a valve in a first position.

As illustrated in FIG. 14, valves 70 can be positioned to control the gas that flows through the hoses 40. The valves 70 can be attached to the fitting 20 at the outlet ports 30 as illustrated in FIG. 14, or can be positioned along the hoses 40 away from the fitting 20. The valves 70 balance opposing thrust-forces in situations in which the terminal resistance is unequal. This can occur when the velocity of the gas moving through one of the hoses 40 is unequal to the other one or more hoses 40, such as if one of the hoses 40 becomes blocked.

FIG. 15 illustrates a schematic view of the valve 70 that includes an inlet 71 through which the gas is received, an outlet 72 through which the gas is expelled, and an intermediate chamber 73. A constriction body 74 is positioned in a receptacle 76 that extends from the chamber 73. The constriction body 74 is biased outward from the receptacle 76 and into the chamber 73 by a biasing member 75, such as a spring or piece of elastic material. The biasing member 75 is configured to apply a nominal force to the constriction body 74.

The constriction body 74 creates a constricted section of the gas path in the chamber 73. This creates a Venturi effect in which the velocity of the gas increases as it passes through the constricted section of the chamber 73 while the static pressure decreases. The valves 70 associated with the different outlet ports 30 are configured to equalize a velocity of the gas that is being delivered through each outlet port 30. This equalizes the reactive thrust exerted on fitting 20 by the escaping gas and provides for the fitting 20 to be thrust-force neutral.

Figure 16:
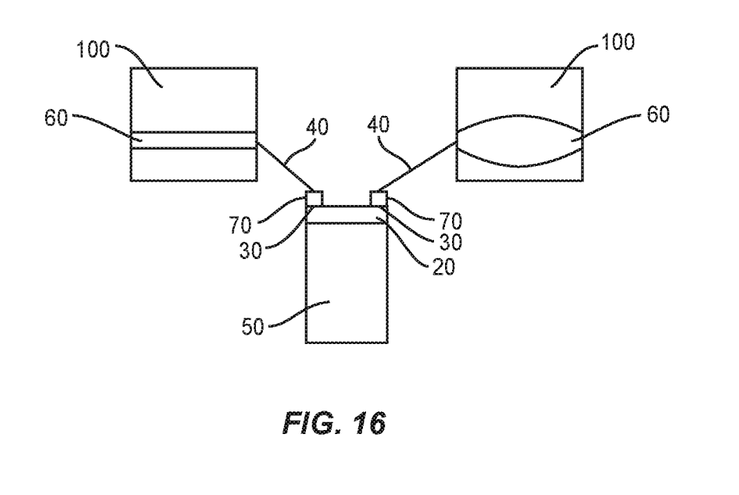
FIG. 16 is a schematic view of an inflation device with a pair of inflatable devices.

FIG. 16 illustrates an example of how the valves 70 balance the thrust forces. The inflation assembly 10 is configured to supply gas to inflation devices 60 in a pair of seats 100. Upon activation, one of the inflation devices 60 does not inflate or inflates at a slower rate (the inflation device 60 on the left of FIG. 16) while the other inflation device 60 (on the right of FIG. 16) inflates at a higher rate. During the inflation, less or no gas is flowing through the left hose 40. This would result in unequal thrust forces being applied to the fitting 20. To address this issue, the right valve 70 would constrict to slow the flow of gas through the right hose 40 and the left valve 70 would open a greater amount to increase the flow of gas through the left hose 40. This equalization of the gas flow rates reduces or eliminates offsets in the reactive thrust forces that are applied by the escaping gas.

FIG. 15 illustrates the valve 70 at a nominal position with the constriction body 74 extending a first amount into the chamber 73. The amount of extension is controlled by the force of the biasing member 75 forcing the constriction body 74 outward into the chamber 73 and the force of the gas moving along the gas path acting on the constriction body 74 and applying an opposing force.

Figure 17:
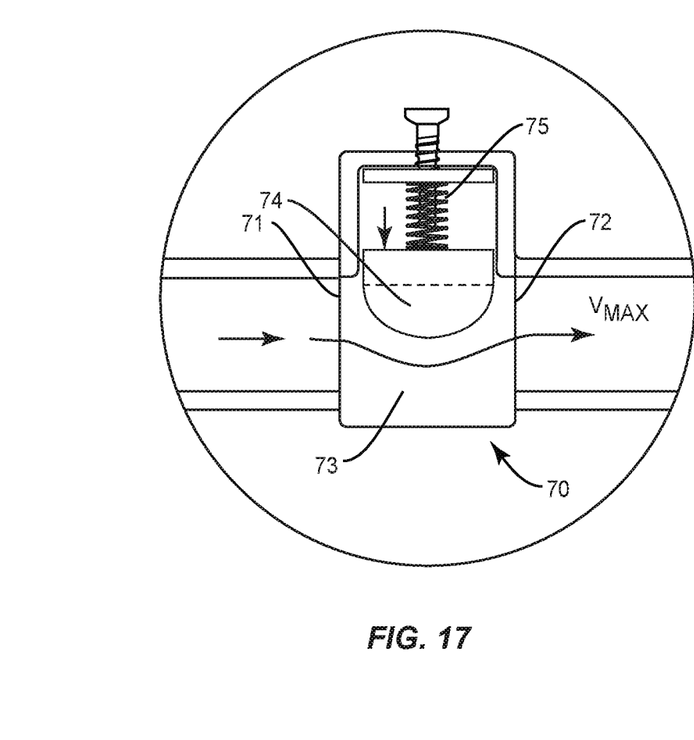
FIG. 17 is a side schematic view of a valve in a second position.

FIG. 17 illustrates the valve 70 in a second orientation with the constriction body 74 extending a greater distance into the chamber 73. This orientation occurs when the velocity of the gas moving through the valve 70 is higher than the nominal amount. The higher velocity causes a decrease in the static pressure which reduces the force of the gas acting on the constriction body 74. This causes the force of the biasing member 75 to move the constriction body 74 outward a greater distance into the chamber 73 and reducing the gas flow.

Figure 18:
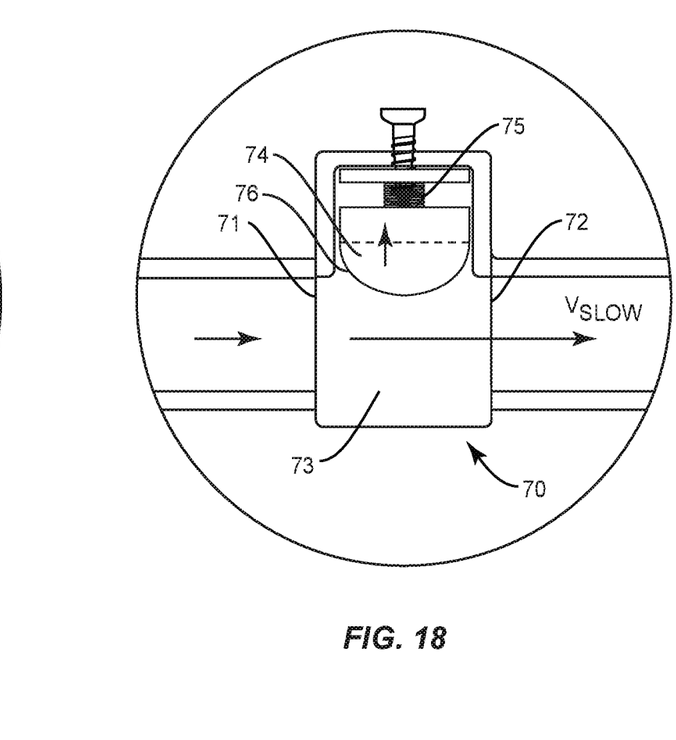
FIG. 18 is a side schematic view of a valve in a third position.

FIG. 18 illustrates the valve 70 in a third orientation with the constriction body 74 recessed into the receptacle 76 a greater distance from the chamber 73. This orientation occurs when the gas velocity is slower than the nominal amount. The slower velocity of the gas causes an increase in static pressure that counters the force of the biasing member 75. This results in gas forcing the constriction body 74 farther out of the chamber 73 and into the receptacle 76 which increases the flow of gas.

Figure 19:
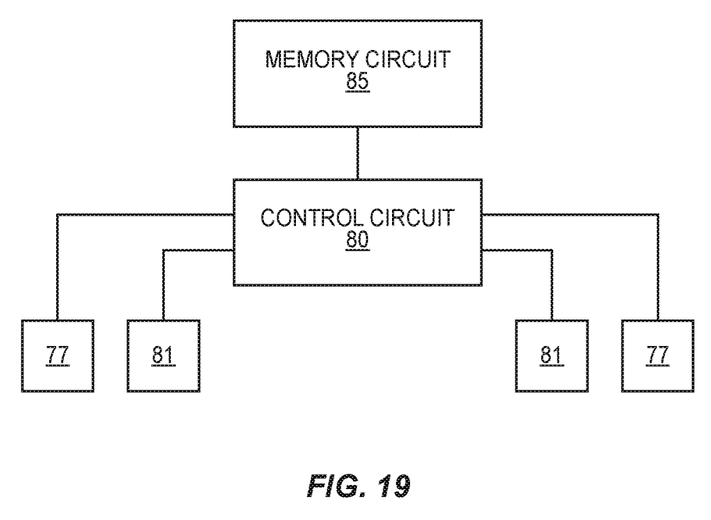
FIG. 19 is a schematic view of a control circuit and components to control flow rates of gas in an inflation device.

The orientation of the valves 70 can also be controlled by a control circuit 80 as illustrated in FIG. 19. The control circuit 80 receives signals from sensors 81 that detect the flow of gas through the hoses 40. The control circuit 80 controls actuators 77 associated with the valves 70 to control the positioning of the constriction body 74 in each of the valves 70.

The control circuit 80 can include one or more microprocessors, microcontrollers, ASICs, or other programmable devices. The control circuit 80 can include an integral or remote non-transitory memory circuit 85 that stores processing logic for the control circuit 80. The control circuit 80 receives signals from the sensors 81 indicative of the flow of gas through the hoses 40. The control circuit 80 can activate the actuators 77 accordingly to control the flow of gas through the hoses 40 to equalize the thrust force exerted by the gas.

The sensors 81 detect the flow of gas through the hoses 40. This can include detecting the velocity of the gas, the pressure of the gas, and the amount or volume of the gas. The sensors 81 can be positioned to detect the flow at one or more of the outlet ports 30, the valves 70, the hoses 40, and the inflatable devices 60. The actuators 82 are electrically controlled and configured to move the constriction bodies 74 relative to the chambers 73.

Figure 20:
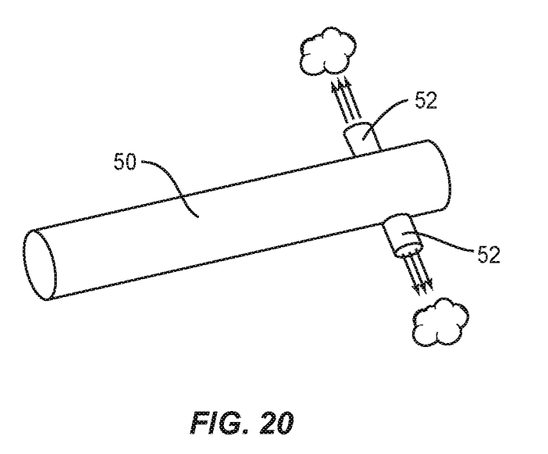
FIG. 20 is a perspective view of a pressure source with a pair of outlets.
Figure 21:
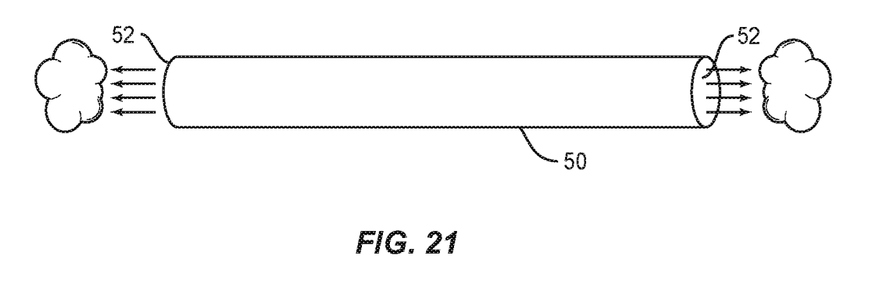
FIG. 21 is a perspective view of a pressure source with a pair of outlets.

The pressure source 50 can include a single outlet 52 through which the pressurized gas is expelled to the fitting 20 (see FIGS. 9, 10). The pressure source 50 can also be configured with multiple outlets 52 that are arranged to neutralize the forces applied by the escaping gas. FIG. 20 includes a pressure source 50 with a pair of outlet outlets 52 on opposing sides of one end of the pressure source 50. The outlets 52 direct the gas in opposing directions such that the reactive thrust forces applied to the pressure source 50 are neutralized. FIG. 21 includes another pressure source 50 that is thrust-neutral with outlets 52 on opposing ends of the pressure source 50 to dispel the gas in opposing directions. Again, the reactive forces applied by the escaping gas counteract each other resulting in a thrust-neutral arrangement.

Figure 22:
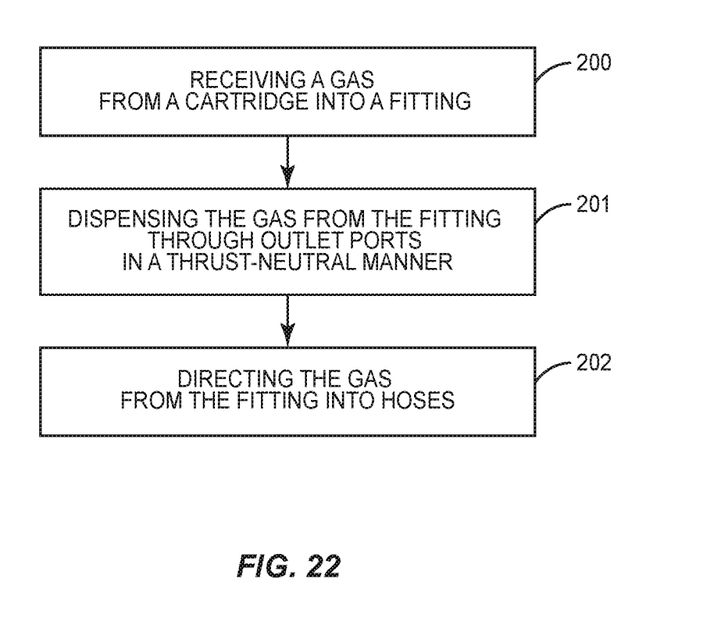
FIG. 22 is a flowchart diagram of a method of delivering gas from a pressure source.

FIG. 22 illustrates a method of delivering gas from a pressure source 50 to an inflatable device 60. Gas at a pressure is received from an outlet 52 of the pressure source 50 and into an interior space 22 of the fitting 20 (block 200). The gas is dispensed from the interior space 22 of the fitting 20 through outlet ports 30 that are spaced apart around the fitting 20 causing the gas to escape from the fitting 20 in a thrust-neutral manner (block 201). The gas is directed into hoses 40 that are attached to each of the outlet ports 30 (block 202).

The inflation assembly 10 provides protection for a variety of persons, including workers who install and maintain the assembly 10, and for passengers in the vehicle. In one aspect, the fitting 20 remains on the pressure source 50 to neutralize forces that are applied to the pressure source 50 when the gas is dispelled. This attachment remains during storage, transportation, installation, once fully installed, and in-service and during maintenance.

The inflation assembly 10 can also be used with an emergency pneumatic mechanical assist device. This can include an explosive device that dispenses gasses that assist in opening a passenger door of an aircraft in an emergency situation. The inflation assembly 10 can be attached to the gas container to provide the thrust-neutral protection.

The pressure source 50 can include a variety of different configurations. In one design, the pressure source is a cartridge or similar device that contains the gas. The cartridge can include various shapes and sizes.

The inflation assembly 10 can be used on a variety of vehicles. One vehicle includes a commercial aircraft that includes rows of seats each configured to accommodate a passenger. Other vehicles include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present disclosure can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. An inflation assembly comprising:
a fitting configured to engage with and receive gas from a pressure source;
wherein the fitting comprises a plurality of outlet ports oriented to direct the gas from the fitting radially outward away from a longitudinal axis of the fitting, the outlet ports being symmetrically disposed about the longitudinal axis; and
a plurality of hoses, each one of the hoses comprising a first hose end mounted to a corresponding outlet port and an opposing second hose end spaced away from the corresponding first hose end, the hose configured to direct the gas exhausted through the corresponding outlet port away from the fitting;
wherein each of the valves comprises a valve inlet that receives the gas, a valve outlet through which the gas is expelled, and a chamber positioned between the valve inlet and the valve outlet, the valve further comprising a constriction body that is biased into the chamber to control a size of the chamber through which the gas moves between the valve inlet and the valve outlet.

2. The inflation assembly of claim 1, wherein the fitting includes a total of two outlet ports that are spaced apart by an angular distance of 180°.

3. The inflation assembly of claim 1, wherein the fitting comprises an opening through which the gas is received and a closed bottom side, the longitudinal axis of the fitting extends through the opening and the bottom side.

4. The inflation assembly of claim 1, further comprising a valve positioned downstream from each one of the outlet ports, each of the valves controls an amount of the gas that flows along the hose that is mounted to the outlet port.

5. The inflation assembly of claim 1, wherein each of the valves moves between a first position with the constriction body extending a first distance into the chamber when the gas is moving along the hose at a first velocity, a second position that extends a greater distance into the chamber than the first distance when the gas moves along the hose at a second velocity that is greater than the first velocity, and a third position that extends a smaller distance into the chamber than the first distance when the gas moving along the hose is at a third velocity that is less than the first velocity.

6. The inflation assembly of claim 1, further comprising sensors positioned along the hoses to sense a flow of the gas along the hoses and a control circuit that receives signals from the sensors, the control circuit operable to equalize a flow of gas along each of the hoses.

7. An inflation assembly comprising:
a pressure source to provide gas at a pressure and an outlet through which the gas is released;
a fitting connected to the pressure source at the outlet, the fitting including an opening through which the gas is received from the pressure source and outlet ports oriented to direct the gas from the fitting radially outward away from a longitudinal axis of the fitting, the outlet ports being equally disposed about the longitudinal axis;
a plurality of hoses connected to the outlet ports to direct the gas away from the pressure source, each of the hoses comprising a first hose end mounted to one of the outlet ports and an opposing second hose end spaced away from the first end;
one or more inflatable devices connected to the second ends of the hoses;
valves positioned downstream from the outlet ports with one of the valves positioned downstream from each one of the outlet ports, each of the valves controls an amount of the gas that flows along one of the hoses; and
a control circuit that controls a size of a chamber of the valves to equalize a flow of gas along each of the hoses.

8. The inflation assembly of claim 7, wherein each of the valves comprises a valve inlet through which the gas is received, a valve outlet through which the gas is expelled, and a chamber positioned between the valve inlet and the valve outlet, the valve further comprising a constriction body that is biased into the chamber to control a size of the chamber through which the gas moves between the valve inlet and the valve outlet.

9. The inflation assembly of claim 8, wherein the constriction body of each of the valves moves between a first position that extends a first distance into the chamber when the gas is moving along the hose at a first velocity, a second position that extends a greater distance into the chamber than the first distance when the gas moving along the hose is at a second velocity that is greater than the first velocity, and a third position that extends a smaller distance into the chamber than the first distance when the gas moving along the hose is at a third velocity that is less than the first velocity.

10. The inflation assembly of claim 7, wherein each of the outlet ports is spaced an equal distance away from the longitudinal axis of the fitting.

11. The inflation assembly of claim 7, wherein at least two of the hoses are connected to one of the inflatable devices.

12. The inflation assembly of claim 7, further comprising a sensor positioned along each of the hoses to sense a flow of the gas along the hose and a control circuit that receives signals from the sensors, the control circuit operable to equalize a flow of gas along each of the hoses.

13. A method of delivering gas from a pressure source, the method comprising:
receiving a gas at a pressure from an outlet of the pressure source and into an interior space of a fitting;

dispensing the gas from the interior space of the fitting through outlet ports that are spaced apart around the fitting causing the gas to escape from the fitting in a thrust-neutral manner;

directing the gas from the fitting into hoses that are attached to each of the outlet ports; and equalizing a flow rate of the gas through each of the outlet ports and each of the hoses.

14. The method of claim 13, further comprising dispensing a first portion of the gas through a first one of the outlet ports in a first radial direction and a second portion of the gas through a second one of the outlet ports in a second radial direction that is opposite from the first radial direction.

15. The method of claim 13, wherein the equalizing a flow rate of the gas through each of the outlet ports and each of the hoses comprises automatically adjusting a valve associated with a first one of the hoses and controlling the flow rate of the gas along the first one of the hoses.

16. The method of claim 13, further comprising reducing a size of a valve associated with a first one of the hoses and equalizing an amount of gas moving through each of the hoses.

17. An inflation assembly comprising:

a pressure source to provide gas at a pressure and an outlet through which the gas is released;

a fitting connected to the pressure source at the outlet, the fitting including an opening through which the gas is received from the pressure source and outlet ports oriented to direct the gas from the fitting radially outward away from a longitudinal axis of the fitting, the outlet ports being equally disposed about the longitudinal axis;

a plurality of hoses connected to the outlet ports to direct the gas away from the pressure source, each of the hoses comprising a first hose end mounted to one of the outlet ports and an opposing second hose end spaced away from the first end;

one or more inflatable devices connected to the second ends of the hoses;

a sensor positioned along each of the hoses to sense a flow of the gas along the hose and a control circuit that receives signals from the sensors, the control circuit operable to equalize a flow of gas along each of the hoses.

* * * * *